United States Patent [19]

Shapiro et al.

[11] 4,075,630
[45] Feb. 21, 1978

[54] SIGNAL PROCESSOR

[75] Inventors: Gerald N. Shapiro, Newton Center; Bertram J. Goldstone, Lexington; Joseph D. Simone, Chelmsford; Edward E. Spignese, Marblehead, all of Mass.

[73] Assignee: Raytheon Company, Lexington, Mass.

[21] Appl. No.: 721,629

[22] Filed: Sept. 1, 1976

[51] Int. Cl.² .............................................. G01S 9/02
[52] U.S. Cl. .................................................. 343/5 DP
[58] Field of Search ...................................... 343/5 DP

[56] References Cited

U.S. PATENT DOCUMENTS

| | | | |
|---|---|---|---|
| 3,950,750 | 4/1976 | Churchill et al. | 343/5 DP X |
| 3,987,285 | 10/1976 | Perry | 343/5 DP X |
| 3,987,442 | 10/1976 | McLeod, Jr. | 343/5 DP X |

Primary Examiner—Malcolm F. Hubler
Attorney, Agent, or Firm—Richard M. Sharkansky; Joseph D. Pannone

[57] ABSTRACT

A signal processor for use in a small, lightweight radar-guided missile to provide a discrete Fast Fourier Transform (FFT) on received radar return signals. The radar return signals are converted into a sequence of binary digits enabling a simple decoder to perform complex addition and subtraction processing, thereby minimizing the space and complexity of the signal processor.

2 Claims, 8 Drawing Figures

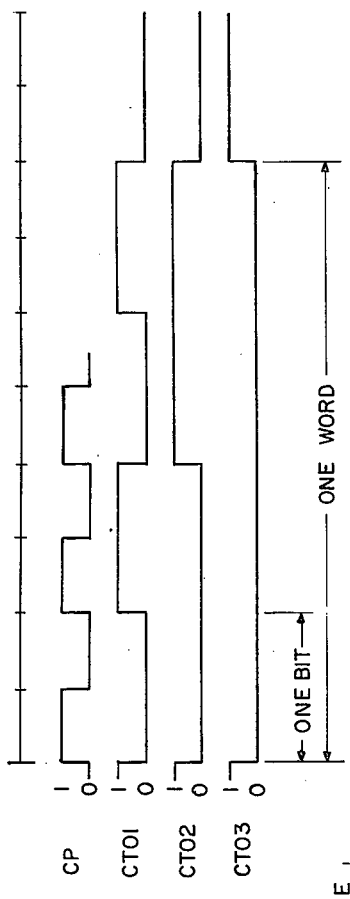

| | | | | | | | | | | | | | | |
|---|---|---|---|---|---|---|---|---|---|---|---|---|---|---|
| CTO 3 | 0 | 1 | 0 | 1 | 0 | 1 | 0 | 1 | 0 | 1 | 0 | 1 | 0 | 1 |
| CTO 4 | 0 | 0 | 1 | 1 | 0 | 0 | 1 | 1 | 0 | 0 | 1 | 1 | 0 | 0 |
| CTO 5 | 0 | 0 | 0 | 0 | 1 | 1 | 1 | 1 | 0 | 0 | 0 | 0 | 1 | 1 |
| CTO 6 | 0 | 0 | 0 | 0 | 0 | 0 | 0 | 0 | 1 | 1 | 1 | 1 | 1 | 1 |
| RAM CONTROL (WEBL) | READ | WRITE INHIBIT | READ | WRITE INHIBIT | READ | WRITE | READ | WRITE | READ | WRITE INHIBIT | READ | WRITE | READ | WRITE |
| RAM OUTPUT (M DOW) | $A_{RE}$ | | $A_{IM}$ | | $B_{RE}$ | | $A_{RE}$ | | $A_{IM}$ | | $B_{IM}$ | | | INPUT |
| MULT COEF (XWT1-XWT5) | $Re[W_n]$ | | $Im[W_n]$ | | | | $Im[W_n]$ | | $Re[W_n]$ | | | | | $cos^2$ WEIGHT |
| SER-PARALLEL MULT OUTPUT (XBOW) | $X_1 = A_{RE} Re[W_n]$ | | $X_2 = A_{IM} Im[W_n]$ | | $X_3 = B_{RE}$ | | $X_4 = A_{RE} Im[W_n]$ | | $X_5 = A_{IM} Re[W_n]$ | | $X_6 = B_{IM}$ | | | $X_7 = cos^2$ WEIGHTED INPUT |
| TEMP STORAGE INPUT (SRIN, FIN1, FIN2) | $(XBOW) = X_1$ | | $(XBOW+SROW) = X_1+X_2$ | | $(XBOW+SROW) A_{RE}=-X_1-X_2+X_3$ | | $(XBOW) = X_4$ | | $(XBOW+SROW) = X_4+X_5$ | | $(XBOW-SROW) A'_{IM}=-X_4-X_5+X_6$ | | | |
| TEMP STORAGE OUTPUT (SROW, FOW1, FOW2) | | | $X_1$ | | $X_1+X_2$ | | $A'_{RE} = -X_1-X_2+X_3$ | | $X_4$ | | $X_4+X_5$ | | $A'_{IM} = -X_4-X_5+X_6$ | |
| RAM INPUT (MDIN) | | | | | (XBOW+ SROW) $X_1+X_2$ $+X_3 =$ $B'_{RE}$ | (SROW) $-X_1-X_2$ $+X_3 =$ $A'_{RE}$ | | | | | (XBOW+ SROW) $X_4+X_5$ $+X_6 =$ $B'_{IM}$ | (SROW) $-X_4-X_5$ $+X_6 =$ $A'_{IM}$ | | (SROW) $X_7$ |

FIG. 7

| INPUT | | | | | | OUTPUT | | | |
|---|---|---|---|---|---|---|---|---|---|
| COT6-COT4 | COT3-COT1 | XBOW | SROW | FOW1 | FOW2 | SRIN | MDIN | FIN1 | FIN2 |
| 0 | 0 | 0 | X | X | X | 0 | | | |
| 0 | 0 | 1 | X | X | X | 1 | | | |
| 0 | 1-7 | 0 | X | X | X | 0 | | | |
| 0 | 1-7 | 1 | X | X | X | 1 | | | |
| 1 | 0 | 0 | 0 | X | X | 0 | | 0 | |
| 1 | 0 | 0 | 1 | X | X | 1 | | 0 | |
| 1 | 0 | 1 | 0 | X | X | 1 | | 0 | |
| 1 | 0 | 1 | 1 | X | X | 0 | | 1 | |
| 1 | 1-7 | 0 | 0 | 0 | X | 0 | | 0 | |
| 1 | 1-7 | 0 | 0 | 1 | X | 1 | | 0 | |
| 1 | 1-7 | 0 | 1 | 0 | X | 1 | | 0 | |
| 1 | 1-7 | 0 | 1 | 1 | X | 0 | | 1 | |
| 1 | 1-7 | 1 | 0 | 0 | X | 1 | | 0 | |
| 1 | 1-7 | 1 | 0 | 1 | X | 0 | | 1 | |
| 1 | 1-7 | 1 | 1 | 0 | X | 0 | | 1 | |
| 1 | 1-7 | 1 | 1 | 1 | X | 1 | | 1 | |
| 2 | 0 | 0 | 0 | X | X | 0 | 0 | 0 | 1 |
| 2 | 0 | 0 | 1 | X | X | 1 | 1 | 0 | 0 |
| 2 | 0 | 1 | 0 | X | X | 1 | 1 | 0 | 1 |
| 2 | 0 | 1 | 1 | X | X | 0 | 0 | 1 | 1 |
| 2 | 1-7 | 0 | 0 | 0 | 0 | 1 | 0 | 0 | 0 |
| 2 | 1-7 | 0 | 0 | 0 | 1 | 0 | 0 | 0 | 1 |
| 2 | 1-7 | 0 | 0 | 1 | 0 | 1 | 1 | 0 | 0 |
| 2 | 1-7 | 0 | 0 | 1 | 1 | 0 | 1 | 0 | 1 |
| 2 | 1-7 | 0 | 1 | 0 | 0 | 0 | 1 | 0 | 0 |
| 2 | 1-7 | 0 | 1 | 0 | 1 | 1 | 1 | 0 | 0 |
| 2 | 1-7 | 0 | 1 | 1 | 0 | 0 | 0 | 1 | 0 |
| 2 | 1-7 | 0 | 1 | 1 | 1 | 1 | 0 | 1 | 0 |
| 2 | 1-7 | 1 | 0 | 0 | 0 | 0 | 1 | 0 | 1 |
| 2 | 1-7 | 1 | 0 | 0 | 1 | 1 | 1 | 0 | 1 |
| 2 | 1-7 | 1 | 0 | 1 | 0 | 0 | 0 | 1 | 1 |
| 2 | 1-7 | 1 | 0 | 1 | 1 | 1 | 0 | 1 | 1 |
| 2 | 1-7 | 1 | 1 | 0 | 0 | 1 | 0 | 1 | 0 |
| 2 | 1-7 | 1 | 1 | 0 | 1 | 0 | 0 | 1 | 0 |
| 2 | 1-7 | 1 | 1 | 1 | 0 | 1 | 1 | 1 | 0 |
| 2 | 1-7 | 1 | 1 | 1 | 1 | 0 | 1 | 1 | 1 |
| 3 | 0 | 0 | 0 | X | X | 0 | 0 | | |
| 3 | 0 | 0 | 1 | X | X | 0 | 1 | | |
| 3 | 0 | 1 | 0 | X | X | 1 | 0 | | |
| 3 | 0 | 1 | 1 | X | X | 1 | 1 | | |
| 3 | 1-7 | 0 | 0 | X | X | 0 | 0 | | |
| 3 | 1-7 | 0 | 1 | X | X | 0 | 1 | | |
| 3 | 1-7 | 1 | 0 | X | X | 1 | 0 | | |
| 3 | 1-7 | 1 | 1 | X | X | 1 | 1 | | |

| INPUT | | | | | | OUTPUT | | | |
|---|---|---|---|---|---|---|---|---|---|
| COT6-COT4 | COT3-COT1 | XBOW | SROW | FOW1 | FOW2 | SRIN | MDIN | FIN1 | FIN2 |
| 4 | 0 | 0 | 0 | X | X | 0 | | 0 | |
| 4 | 0 | 0 | 1 | X | X | 1 | | 0 | |
| 4 | 0 | 1 | 0 | X | X | 1 | | 0 | |
| 4 | 0 | 1 | 1 | X | X | 0 | | 1 | |
| 4 | 1-7 | 0 | 0 | 0 | X | 0 | | 0 | |
| 4 | 1-7 | 0 | 0 | 1 | X | 1 | | 0 | |
| 4 | 1-7 | 0 | 1 | 0 | X | 1 | | 0 | |
| 4 | 1-7 | 0 | 1 | 1 | X | 0 | | 1 | |
| 4 | 1-7 | 1 | 0 | 0 | X | 1 | | 0 | |
| 4 | 1-7 | 1 | 0 | 1 | X | 0 | | 1 | |
| 4 | 1-7 | 1 | 1 | 0 | X | 0 | | 1 | |
| 4 | 1-7 | 1 | 1 | 1 | X | 1 | | 1 | |
| 5 | 0 | 0 | 0 | X | X | 0 | 0 | 0 | 1 |
| 5 | 0 | 0 | 1 | X | X | 1 | 1 | 0 | 0 |
| 5 | 0 | 1 | 0 | X | X | 1 | 1 | 0 | 1 |
| 5 | 0 | 1 | 1 | X | X | 0 | 0 | 1 | 1 |
| 5 | 1-7 | 0 | 0 | 0 | 0 | 1 | 0 | 0 | 0 |
| 5 | 1-7 | 0 | 0 | 0 | 1 | 0 | 0 | 0 | 1 |
| 5 | 1-7 | 0 | 0 | 1 | 0 | 1 | 1 | 0 | 0 |
| 5 | 1-7 | 0 | 0 | 1 | 1 | 0 | 1 | 0 | 1 |
| 5 | 1-7 | 0 | 1 | 0 | 0 | 0 | 1 | 0 | 0 |
| 5 | 1-7 | 0 | 1 | 0 | 1 | 1 | 1 | 0 | 0 |
| 5 | 1-7 | 0 | 1 | 1 | 0 | 0 | 0 | 1 | 0 |
| 5 | 1-7 | 0 | 1 | 1 | 1 | 1 | 0 | 1 | 0 |
| 5 | 1-7 | 1 | 0 | 0 | 0 | 0 | 1 | 0 | 1 |
| 5 | 1-7 | 1 | 0 | 0 | 1 | 1 | 1 | 0 | 1 |
| 5 | 1-7 | 1 | 0 | 1 | 0 | 0 | 0 | 1 | 1 |
| 5 | 1-7 | 1 | 0 | 1 | 1 | 1 | 0 | 1 | 1 |
| 5 | 1-7 | 1 | 1 | 0 | 0 | 1 | 0 | 1 | 0 |
| 5 | 1-7 | 1 | 1 | 0 | 1 | 0 | 0 | 1 | 0 |
| 5 | 1-7 | 1 | 1 | 1 | 0 | 1 | 1 | 1 | 0 |
| 5 | 1-7 | 1 | 1 | 1 | 1 | 0 | 1 | 1 | 1 |
| 6 | 0 | 0 | 0 | X | X | | 0 | | |
| 6 | 0 | 0 | 1 | X | X | | 1 | | |
| 6 | 0 | 1 | 0 | X | X | | 0 | | |
| 6 | 0 | 1 | 1 | X | X | | 1 | | |
| 6 | 1-7 | 0 | 0 | X | X | | 0 | | |
| 6 | 1-7 | 0 | 1 | X | X | | 1 | | |
| 6 | 1-7 | 1 | 0 | X | X | | 0 | | |
| 6 | 1-7 | 1 | 1 | X | X | | 1 | | |
| 7 | 0 | 0 | X | X | X | | 0 | | |
| 7 | 0 | 1 | X | X | X | | 1 | | |
| 7 | 1-7 | 0 | X | X | X | | 0 | | |
| 7 | 1-7 | 1 | X | X | X | | 1 | | |

KEY:
X - OVER ALL COMBINATIONS OF THAT INPUT
▨ - DON'T CARE
1-7 - FOR ALL COMBINATIONS OF CT03-CT01 EXCEPT 000

SIGNAL PROCESSOR

The invention herein described was made in the course of or under a contract or subcontract thereunder, with the Department of Defense.

BACKGROUND OF THE INVENTION

This invention relates generally to signal processors and more particularly to signal processors which are used in lightweight radar-guided missiles to process radar return signals using digital Fast Fourier Transform (FFT) techniques in order to analyze the frequency spectrum of such radar return signals.

As is known in the art, in a ground based radar system detection of a target in a noise or clutter environment may be obtained by discriminating between the Doppler frequency of the target and the Doppler frequency of the noise or clutter. One technique which may be used in such frequency discrimination is through the use of a Fast Fourier Transform (FFT) processor. In particular, generally the video output of the radar receiver is sampled and converted into corresponding digital words. The digital words are processed in parallel form, the number of bits in each one of such digital words being related to the dynamic range of the signal to be analyzed. The Fast Fourier Transform processor processes these digital words to produce a set of digital words which correspond to discrete frequency components of the frequency spectrum of the received radar signals. A digital computer may then be included to process the output of the Fast Fourier Transform (FFT) processor and thereby provide signals which enable the ground based radar system to "frequency" track a target, such target being selected in accordance with its Doppler frequency as analyzed by the FFT processor.

While such FFT processor may theoretically be used in a small, lightweight radar-guided missile, because of the restriction on space and weight in such missile, and in order to provide maximum signal processing capability within such a missile, it is necessary that the number of components used in "on board" signal processing equipment be minimized. In this regard, the Fast Fourier Transform (FFT) processor may generally be characterized as a digital processor which repetitively performs the basic computations:

$$AW + B; AW - B,$$

where A and B are complex digital words, each initially associated with a different one of N digital samples, generally of the radar video signal the frequency spectrum of which is to be analyzed, and W is a complex digital word which serves as a weighting coefficient. The above computations would be performed by processing such digital words in parallel form, as mentioned above, using a complex multiplier to perform the AW portion of the calculation, a storage means for storing such portion of the calculation, and a complex parallel adder and subtractor for adding and subtracting the stored portion of the calculation to and from, respectively, the B portion of the calculation. While such complex adder and subtractor may adequately perform the required calculations, in a radar guided missile application where the number of bits in each digital word, which is presented in parallel form, may be in the order of 16 to 32 bits, the complex adder and subtractor increase the size and complexity of the FFT processor such that its use in the missile may be prevented.

SUMMARY OF THE INVENTION

With this background of the invention in mind it is therefore an object of this invention to provide an improved signal processor for use in a small, lightweight radar-guided missile, such signal processor being adapted to perform a discrete Fast Fourier Transform on radar return signals received by a radar receiver included in such missile.

This and other objects of the invention are attained generally by providing, in a radar-guided missile having a radar receiver for receiving radar return signals, a signal processor for processing such radar return signals to provide a discrete Fast Fourier Transform on such radar return signals, such signal processor including: Means for separating such radar return signals into two quadrature components; means for converting each sample of such components into a corresponding digital word; means for converting each digital word into a sequence of binary digits; clock means for producing a sequence of binary control signals; scaling decoder means, responsive to at least a portion of the sequence of binary control signals, for scaling each digital word by a factor selected in accordance with the binary control signals to form a sequence of binary digits corresponding to such scaled digital word; means for storing and serially retrieving such latter sequence of binary digits; data decoder means, responsive to at least a portion of the sequence of binary control signals, the serially retrieved sequence of binary digits and a second sequence of binary digits corresponding to a different one of the digital words for producing a sequence of binary digits corresponding to an arithmetic operation of the digital words in the two sequences of binary digits responded to by the data decoder means.

With such an arrangement the conversion of the digital words corresponding to samples of the radar return signals into a sequence of digital digits enables a relatively simple decoder to perform complex addition and subtraction processing, regardless of the number of bits in such digital word, and in addition to generate control words and routine data, thereby minimizing the space and complexity of the FFT processor and enabling such FFT processor to be used in a small lightweight radar-guided missile.

BRIEF DESCRIPTION OF THE DRAWINGS

The foregoing features of the invention, as well as the invention itself, may be more fully understood from the following detailed description read together with the accompanying drawings, in which:

FIG. 6 is a timing diagram useful in understanding the operation of the FFT processor shown in FIG. 5;

FIG. 7 is a Table useful in understanding the operation of the FFT processor shown in FIG. 5; and FIG. 8 is a Table useful in understanding the operation of the FFT processor shown in FIG. 5.

DESCRIPTION OF THE PREFERRED EMBODIMENT

General

Figure 1:
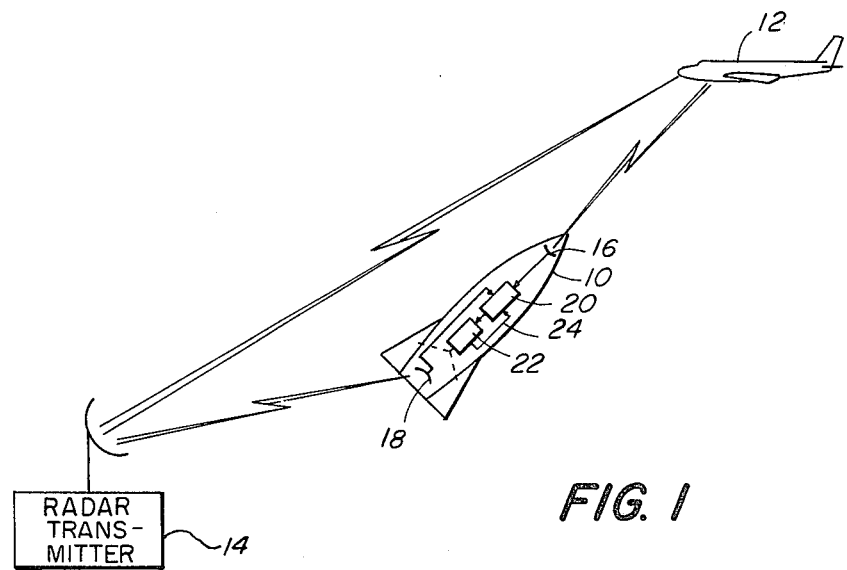
FIG. 1 is a sketch, greatly simplified and somewhat distorted, showing a small lightweight radar guided missile directed toward a target aircraft.

Referring now to FIG. 1, a small lightweight air-to-air missile 10, here a continuous wave (cw) semiactive radar-guided missile, is shown directed and guided to intercept a target aircraft 12 in response to radar signals transmitted by radar transmitted by radar transmitter 14. A portion of such transmitted signals is received directly by an antenna 18 mounted in the aft end of the missile 10, and another portion of such transmitted signals is, after reflection by the target aircraft 12, received by a front mounted antenna 16. The signals produced by the front and rear mounted antennas are fed to a conventional radar receiver 20. The output of such receiver 20 is a signal having frequency components related to the difference in frequency between the signals received by the front and rear mounted antennas 16, 18. Therefore, such signal has a frequency component related to the Doppler frequency of the target aircraft 12 and to the Doppler frequency of any clutter, not shown. The signals produced at the output of receiver 20 are fed to a signal processor 22 which analyzes the frequency components of such signal in a manner to be discussed in detail in connection with FIG. 2. Suffice it to say here that the signal processor 22 produces a frequency tracking control signal on line 24 for enabling the radar receiver 20 to track the Doppler frequency of the target aircraft 12 using conventional heterodyning techniques. Once the target aircraft 12 is being "frequency" tracked by the radar receiver 20, guidance signals are produced by an autopilot (not shown), such produced signals then being fed to the control surfaces of the missile 10 through conventional actuator means (not shown) thereby to aerodynamically direct the missile 10 to intercept the target aircraft 12 in a conventional manner.

Figure 2:
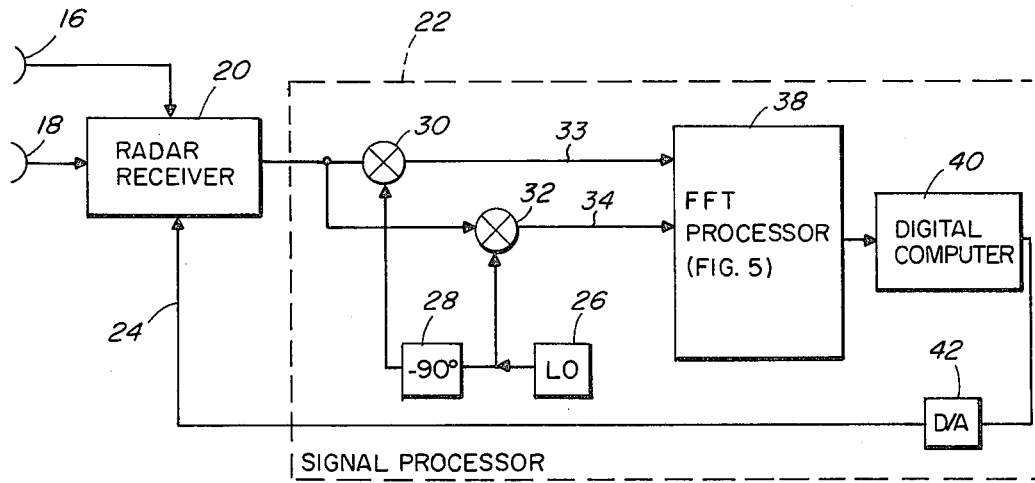
FIG. 2 is a simplified block diagram of a radar receiver and signal processor, both included in the radar guided missile shown in FIG. 1.

Referring now to FIG. 2, the signal produced by the radar receiver 20 is shown being fed to the signal processor 22. Signal processor 22 includes a local oscillator 26, a $-90°$ phase shifter 28 and a pair of mixers 30, 32, all of conventional design and arrangement, to produce a pair of quadrature video signals, generally referred to as the "in phase" signal and the "out of phase" or "quadrature" signal as described in *Radar Handbook*, Editor-In-Chief Merrill I. Skolnik, McGraw-Hill Book Company, 1970, pgs. 5-38 through 5-43. The "in phase" and "quadrature" signals are fed to a Fast Fourier Transform (FFT) processor 38, the details of which will be discussed in connection with FIG. 5. Suffice it to say here that such FFT processor 38 separates the frequency spectrum of the radar return signals received by the radar receiver 20 into a predetermined number of discrete components. The discrete components are represented by digital words having a number of bits consistent with the dynamic range of the signals produced at the output of the radar receiver 20. The digital words are passed to a digital computer 40, here of any conventional design, which analyzes the various frequency components represented by the digital words, selects the frequency component associated with the Doppler frequency of the target aircraft 12 (as distinguished from the Doppler frequency from clutter) and produces a digital word corresponding to such target aircraft Doppler frequency. This digital word produced by the digital computer 40 is converted into a corresponding analog signal by a conventional digital-to-analog (D/A) converter 42. The analog signal provides the frequency tracking control signal on line 24 which enables the radar receiver 20 to become frequency tuned to the target aircraft return signals in a conventional manner as, for example, that described on pgs. 16-19 through 16-20 of the above referenced *Radar Handbook*.

Figure 3:
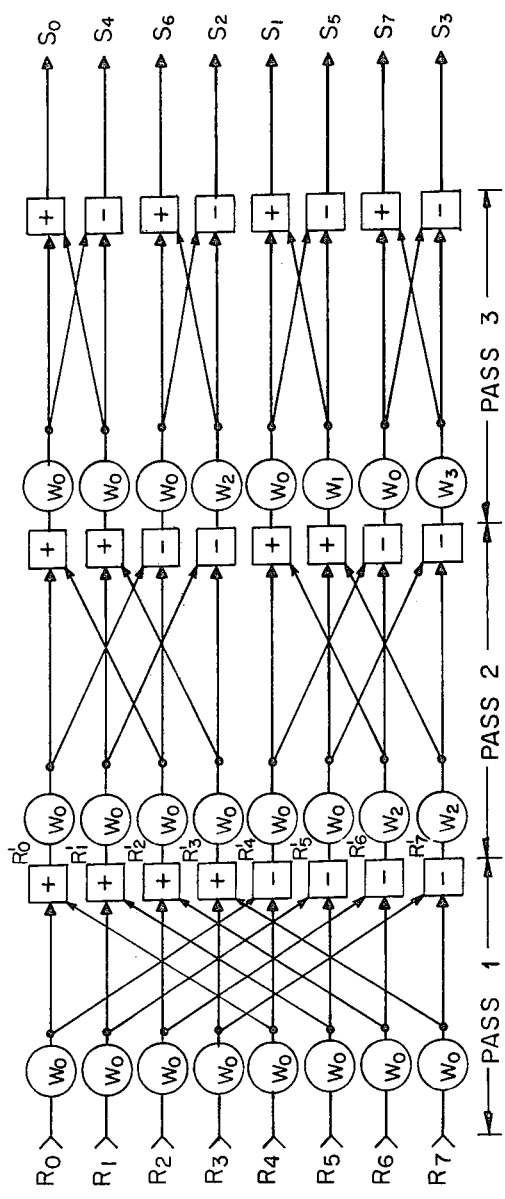
FIG. 3 is a flow diagram representing the discrete Fast Fourier Transform algorithm to be performed by an FFT processor included in the signal processor shown in FIG. 2.
Figure 4:
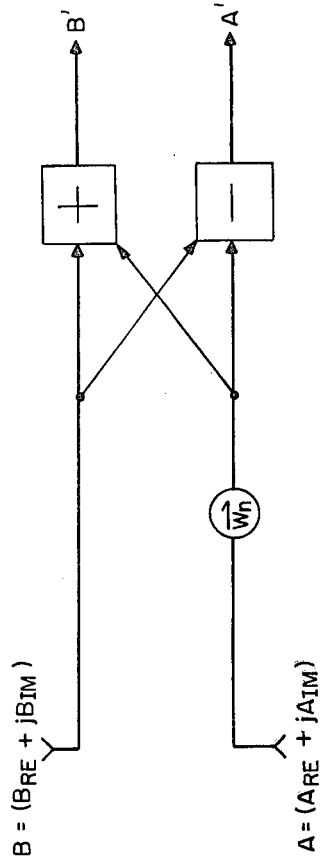
FIG. 4 is a flow diagram representing a portion of the FFT algorithm represented in FIG. 3.

Referring now to FIG. 3, a flow diagram representing the particular discrete Fast Fourier Transform to be performed by the FFT processor 38 is shown, such algorithm here being an eight point discrete Fast Fourier Transform. That is, here eight succeeding samples of the radar returns passed to the signal processor 22, $R_0$-$R_7$, respectively, are used to derive eight discrete frequency components of such radar return signals. It is here noted that an eight point transform has here been selected in order to simplify the construction and operation of the FFT processor 38, it being understood that a larger number of points would generally be used, and the FFT processor 38 correspondingly modified to accommodate the additional points in a manner which will become apparent. Each one of the samples $R_0$-$R_7$ is a complex digital word and has two portions, each portion having here four bits, one portion, the "real" portion, corresponding to the "in phase" component of the sampled signal and the other portion, the "imaginary" portion, corresponding to the "quadrature" component of the sampled signal. It should be understood that the number of bits in the digital word is related to the dynamic range or expected variation in the amplitude of the radar returns and that the 8 bit wordlength has been selected for simplicity, it being understood that in the missile application herein described a 16 to 32 bit digital word would generally be used. In such application the FFT processor 38 would be modified in a simple manner which will become readily apparent hereinafter. Again referring to FIG. 3, as is well known, the processing of the samples here involves three passes (i.e., pass 1, pass 2, pass 3), each pass involving four so-called "Butterfly" computations, an exemplary one of which is represented in the flow diagram shown in FIG. 4. That is, referring to FIGS. 3 and 4, and considering samples $R_0$ and $R_4$, during the first pass, i.e., pass 1, these samples, which may be represented as B and A respectively, are processed as represented in FIG. 6 as $$B' = AW_n + B \qquad \text{(Eq. 1)}$$

$$A' = B - AW_n \qquad \text{(Eq. 2)}$$

where $A = A_{RE} + j\,A_{IM}$;

$B = B_{RE} + j\,B_{IM}$; and $W_n$ is a complex weighting coefficient (or scaling factor) $e^{j2\pi n/8} = e^{j\pi n/4}$.

These resulting complex words B' and A' may be considered as "samples" $R_0'$ and $R_7'$ for pass 2. After pass 3 is completed the frequency components of the sampled signal appear as complex digital words $S_0$-$S_7$. It is therefore evident from the above discussion that the discrete Fast Fourier Transform process involves the repetitive computation of Equations (1) and (2) as represented by the flow diagram shown in FIG. 4.

From such diagram, the digital words B' and A' may be represented by the following equations:

$$B' = B'_{RE} + jB'_{IN} = [B_{RE} + A_{RE}\cos \pi n/4 - A_{IM}\sin \pi n/4] + j[B_{IM} + A_{RE}\sin \pi n/4 + A_{IM}\cos \pi n/4] \quad \text{(Eq. 3)}$$

$$A' = A'_{RE} + jA'_{IM} = [B_{RE} - A_{RE}\cos \pi n/4 + A_{IM}\sin \pi n/4] + j[B_{IM} - A_{RE}\sin \pi n/4 - A_{IM}\cos \pi n/4] \quad \text{(Eq. 4)}$$

where $\cos \pi n/4 = Re[Wn]$
and $\sin \pi n/4 = Im[Wn]$.

FAST FOURIER TRANSFORM PROCESSOR

Figure 5:
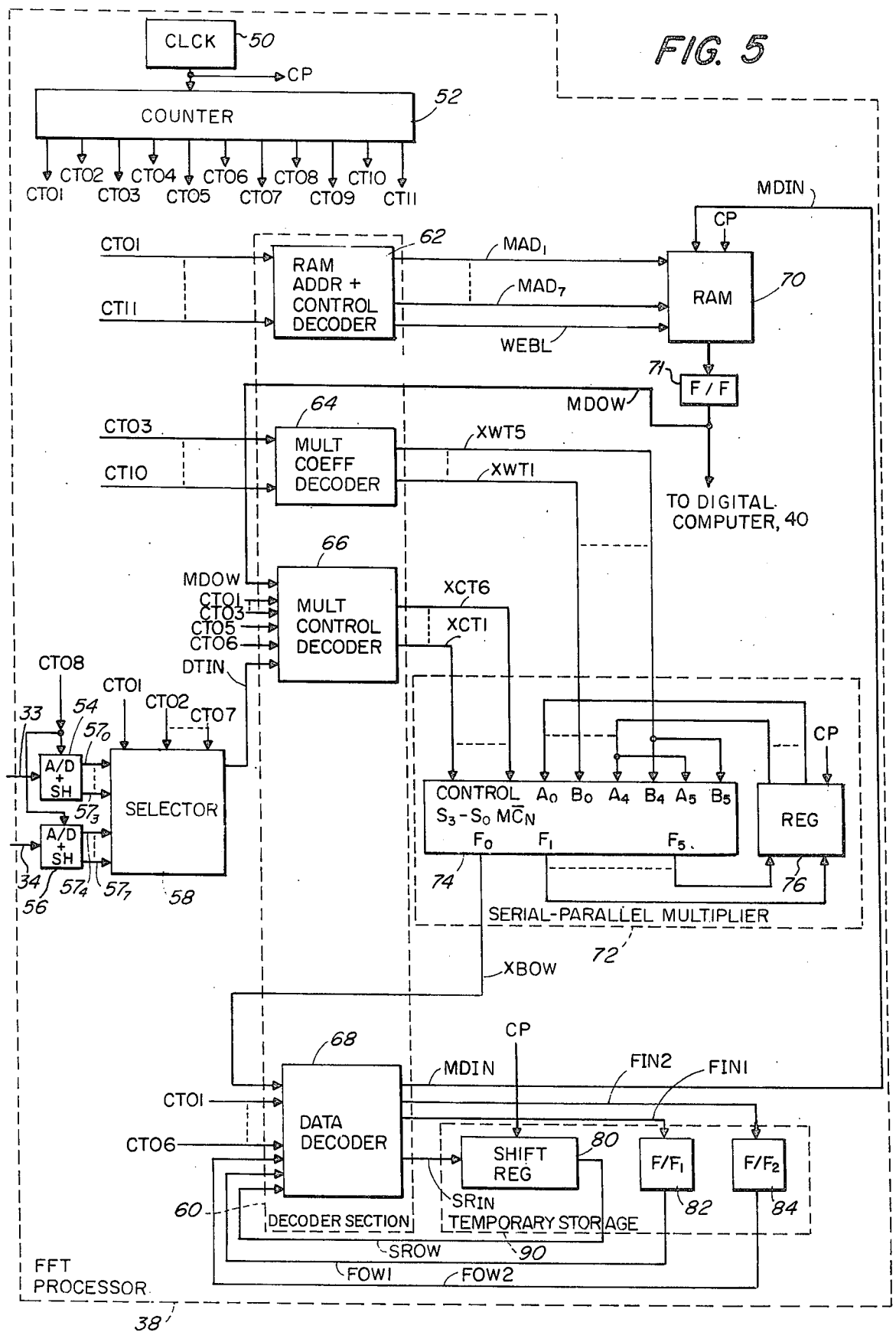
FIG. 5 is a block diagram of the FFT processor shown in FIG. 2.

Referring now to FIG. 5, FFT processor 38 is shown to include a conventional clock pulse generator (CLCK) 50, here of any conventional design, adapted to produce a sequence of clock pulses on line CP. A counter 52, here also of any conventional design, is included to count the pulses on line CP and to produce a train of binary signals on lines CT01-CT11. It is noted that here the frequency of the pulses produced by the clock generator 50 is $f$ and the trains of pulses on lines CT01-CT11 are $f/2^{01}$-$f/2^{11}$, respectively, and more generally the frequency of the train of pulses on line CTm is $f/2^m$. For example, the time relationship between the pulses on line CP and the trains of pulses on lines CT01, CT02 and CT03 are shown in FIG. 6. It should here be mentioned that a binary 1 signal is sometimes hereinafter referred to as a "high" signal and a binary 0 signal is sometimes hereinafter referred to as a "low" signal.

Referring again to FIG. 5, FFT processor 38 is shown to include a pair of sample/hold and analog-to-digital (A/D) converters 54, 56, respectively. In response to a "high" to "low" signal transition on line CT07 the level of the sampled signals is converted into digital words, sample/hold and A/D converter 54 producing a digital word (here four bits in length using two's complement notation) corresponding to the "in phase" signal (on line 33) and sample/hold and A/D converter 56 produces a digital word (here four bits in length using two's complement notation) corresponding to the "quadrature" signal (on line 34). The digital words produced by sample/hold and A/D converters 54, 56 may be considered as a single digital word, parallel in form, having eight bits, four bits (those produced by sample/hold and A/D converter 54) being considered as the "real" portion of such word (as discussed in connection with FIG. 3) and four bits (those produced by sample/hold and A/D converter 56) being considered as the "imaginary" portion of such word (as discussed above in connection with FIG. 3). In any event, the eight bit digital word is in parallel form which, as is well known, means that all 8 bits of such word appear concurrently on eight lines $57_0$-$57_7$, each line carrying a different one of the eight bits.

The lines $57_0$-$57_7$ are fed to a selector 58, such selector here being a conventional 8 to 1 selector. In particular, a three bit control signal, provided by lines CT01, CT02 and CT07, couples a selected one of the lines $57_0$-$57_7$ to the output line DTIN of selector 58. Because of the sequencing of the signals on lines CT01, CT02 and CT07, the lines $57_0$-$57_7$ become coupled to line DTIN in the following manner: Lines $57_0$, $57_1$, $57_2$ and $57_3$ become sequentially applied to line DTIN cyclically sixteen times (i.e., as when line CT07 is "low") and then lines $57_4$, $57_5$, $57_6$, $57_7$ become sequentially applied to line DTIN cyclically sixteen times (i.e., as when line CT07 is "high"). Therefore, if the digital word applied on lines $57_0$-$57_7$ is represented as $D_0$-$D_7$, such digital word is converted by selector 58 in response to control signals on lines CT01, CT02, CT07 into serial form, that is as a sequence of binary digits. It should be noted that the least significant bit (LSB) ($D_0$) of the real portion of such digital word is the bit on line $57_0$), the most significant bit (MSB) ($D_3$) of such real portion of such digital word is the bit on line $57_3$, the least significant bit of the imaginary portion of such digital word is the bit on line $57_4$ and the most significant bit of the imaginary portion of such digital word is the bit on line $57_7$. Therefore, bits $D_0$-$D_3$ become sequentially applied to line DTIN cyclically sixteen times (when line CT07 is "low") and then bits $D_4$-$D_7$ become sequentially applied to line DTIN cyclically sixteen times (when line CT07 is "high").

FFT processor 38 is shown in FIG. 5 to include a decoder section 60. Decoder section 60 includes a random access memory (RAM) address and control decoder 62, a multiplier coefficient decoder 64, a multiplier control decoder 66 and a data decoder 68. It is here noted that decoders 62-68 are here conventional integrated circuit, read only memories (ROM's).

RAM ADDRESS AND CONTROL DECODER

RAM address and control decoder 62 produces: (1) a binary word on lines $MAD_1$-$MAD_7$ which represents the read/write address to random access memory (RAM) 70; and (2) a binary signal on line WEBL which controls the read/write mode of such RAM 70. RAM 70 is here a conventional integrated circuit random access memory having 128 bit storage capacity. Here such RAM 70 is arranged to store 128 binary words, each word being one bit in length. Therefore, one bit of data applied to line MDIN becomes stored into RAM 70 at the location specified by the digital word on lines $MAD_1$-$MAD_7$ in response to a clock pulse on line CP and a high signal (i.e., 1) on line WEBL. When line WEBL is low (i.e., 0) the one bit of data stored in the location specified by the digital word on lines $MAD_1$-$MAD_7$ emerges from RAM 70 and passes through a D-type latch flip-flop 71 to line MDOW. The D-type latch flip-flop 71 holds the bit read from RAM 70 during the time the clock pulse (CP) is low. (FIG. 6).

MULTIPLIER COEFFICIENT DECODER

Multiplier coefficient decoder 64 provides a five bit digital word on lines $XWT_1$-$XWT_5$ in response to binary signals on lines CT03-CT10. The digital word produced by such decoder 64 is related to the real and imaginary portions (i.e., Re $[W_n]$ and Im $[W_n]$, respectively, of the complex weighting coefficient $W_n$ discussed above in connection with FIGS. 3 and 4 and Equations (1)-(4).

SERIAL-PARALLEL MULTIPLIER

Serial-parallel multiplier 72 includes an arithmetic logic unit (ALU) 74 of any conventional design, here made up of two SN 54181 integrated circuits manufactured by Texas Instruments, Incorporated, Dallas, Texas, the carry output bit of one being coupled to the carry input of the other in a conventional manner to produce an ALU adapted to perform an arithmetic operation on a first digital word, applied in parallel form to terminals $A_5$-$A_0$, and a second digital word, applied in parallel form, to terminals $B_5$-$B_0$, such arithmetic operation being controlled by the digital word applied in parallel form to control terminals $S_0$-$S_3$, mode terminal M and carry terminal $\overline{C}_N$.

The operation of the ALU 74 in response to the control signals is summarized in the following Table I:

$XCT_1$---$XCT_6$, respectively as indicated. The control signals are generated by the decoder 66 in response to a digital word applied to lines CT05, CT06, CT03, CT02, CT01, MDOW and DTIN. The decoder 66 decodes the binary signals on such lines as represented in the following Table II:

TABLE II

| | Multiplier Control Decoder | | | | | | | | | | | |
|---|---|---|---|---|---|---|---|---|---|---|---|---|
| | INPUT TO DECODER 66 | | | | | | OUTPUT OF DECODER 66 | | | | | |
| | | | | | | | XCT1 ($S_3$) | XCT2 ($S_2$) | XCT3 ($S_1$) | XCT4 ($S_0$) | XCT5 (M) | XCT6 ($\overline{C}_N$) |
| | CT05 | CT06 | CT03 | CT02 | CT01 | MDOW | DTIN | | | | | |
| WITH CT05,CT06: | | | 0 | 0 | 0 | 0 | X | 0 | 0 | 1 | 1 | 1 | Y |
| 0,0; 0,1; or 1,0. | | | 0 | 0 | 0 | 1 | X | 1 | 0 | 1 | 0 | 1 | Y |
| | | | 0 | 0 | 1 | 0 | X | 1 | 1 | 1 | 1 | 1 | Y |
| | | | 0 | 0 | 1 | 1 | X | 1 | 0 | 0 | 1 | 0 | 1 |
| | | | 0 | 1 | 0 | 0 | X | 1 | 1 | 1 | 1 | 1 | Y |
| | | | 0 | 1 | 0 | 1 | X | 1 | 0 | 0 | 1 | 0 | 1 |
| | | | 0 | 1 | 1 | 0 | X | 1 | 1 | 1 | 1 | 1 | Y |
| | | | 0 | 1 | 1 | 1 | X | 0 | 1 | 1 | 0 | 0 | 0 |
| | | | 1 | X | X | X | X | 1 | 1 | 1 | 1 | 1 | Y |
| WITH CT05,CT06: | | | 0 | 0 | 0 | X | 0 | 0 | 0 | 1 | 1 | 1 | Y |
| 1,1. | | | 0 | 0 | 0 | X | 1 | 1 | 0 | 1 | 0 | 1 | Y |
| | | | 0 | 0 | 1 | X | 0 | 1 | 1 | 1 | 1 | 1 | Y |
| | | | 0 | 0 | 1 | X | 1 | 1 | 0 | 0 | 1 | 0 | 1 |
| | | | 0 | 1 | 0 | X | 0 | 1 | 1 | 1 | 1 | 1 | Y |
| | | | 0 | 1 | 0 | X | 1 | 1 | 0 | 0 | 1 | 0 | 1 |
| | | | 0 | 1 | 1 | X | 0 | 1 | 1 | 1 | 1 | 1 | Y |
| | | | 0 | 1 | 1 | X | 1 | 0 | 1 | 1 | 0 | 0 | 0 |
| | | | 1 | X | X | X | X | 1 | 1 | 1 | 1 | 1 | Y |

X = for either "0" or "1" input, same output results
Y = don't care

TABLE I

| Control Signals | | | | | | Arithmetic Operation Output on Terminals |
|---|---|---|---|---|---|---|
| $S_3$ | $S_2$ | $S_1$ | $S_0$ | M | $\overline{C}_N$ | $F_5$-$F_0$ |
| 0 | 0 | 1 | 1 | 1 | X | 0-0 |
| 1 | 0 | 1 | 0 | 1 | X | $B_5$-$B_0$ |
| 1 | 1 | 1 | 1 | 1 | X | $A_5$-$A_0$ |
| 1 | 0 | 0 | 1 | 0 | 1 | $(B_5$-$B_0) + (A_5$-$A_0)$ |
| 0 | 1 | 1 | 0 | 0 | 0 | $(A_5$-$A_0) - (B_5$-$B_0)$ |

X = don't care

As indicated in the Table above, the ALU will provide at its output terminals $F_5$-$F_0$ either: (1) 0---0; (2) the digital word on the $B_5$-$B_0$ terminals; the digital word on the terminals $A_5$---$A_0$; the digital word on terminals $A_5$---$A_0$ minus the digital word on terminals $B_5$---$B_0$, selectively, in accordance with the control signals.

The terminal $F_0$ provides the output line XBOW for the serial parallel multiplier 72. The terminals $F_5$-$F_1$ are coupled to a register 76. Register 76, in response to a clock pulse on line CP, stores the digital word applied in parallel form on terminals $F_5$-$F_1$, the terminal $F_1$ presenting the LSB of such word and the terminal $F_5$ presenting the MSB of such word. The stored digital word is applied to terminals $A_5$---$A_0$ such that the LSB of the stored word becomes coupled to terminal $A_0$ and the MSB becomes coupled to terminal $A_4$, and also to terminal $A_5$.

MULTIPLIER CONTROL DECODER

The control signals to terminals $S_3$---$S_0$, M and CN are supplied by multiplier control decoder on lines

SERIAL-PARALLEL MULTIPLICATION EXAMPLE

As will become apparent with the following example, a digital word, the multiplier, presented in serial form on line MDOW (when CT05, CT06 is: 0,0; 0,1; or 1,0) or on line DTIN (when CT05, CT06 is 1,1) becomes multiplied by the digital word, the multiplicand, on lines $XWT_5$-$XWT_1$ entering the serial-multiplier 72. In particular, when the multiplier is selected from line DTIN and the multiplicand is an amplitude weighting function, here the well known "cosine-squared" function, and when the multiplier is selected from line MDOW the multiplicand is either Re[$W_n$] or Im[$W_n$]. It is here noted that the coefficients supplied by the multiplier coefficient decoder 64 is scaled by a factor of 0.5 in order to keep subsequent computations from overflowing the processor.

Consider the following example:

Multiplicand = 01011 (applied in parallel form to terminals $B_4$-$B_0$. It is noted that terminal $B_5$ is connected to terminal $B_4$.)

Multiplier = 0101 (applied in serial form to line DTIN when lines CT05, CT06 are 1,1 and to line MDOW when lines CT05, CT06 are either: 0,0; 0,1; or 1,0.)

| CLOCK PULSE | CT03 | CT02 | CT01 | MDOW/DTIN | B---B 5   0 | A---A 5   0 | F---F 5   1 | F 0 |
|---|---|---|---|---|---|---|---|---|
| 1 | 0 | 0 | 0 | 1 | 001011 | XXXXXX | 00101 | 1 |
| 2 | 0 | 0 | 1 | 1 | . | 000101 | 00010 | 1 |
| 3 | 0 | 1 | 0 | 1 | . | 000010 | 00110 | 1 |
| 4 | 0 | 1 | 1 | 0 | . | 000110 | 00011 | 0 |
| 5 | 1 | 0 | 0 | X | . | 000011 | 00001 | 1 |

-continued

| CLOCK PULSE | CT03 | CT02 | CT01 | MDOW/DTIN | B···B 5 0 | A···A 5 0 | F···F 5 1 | F 0 |
|---|---|---|---|---|---|---|---|---|
| 6 | 1 | 0 | 1 | X | . | 000001 | 00000 | 1 |
| 7 | 1 | 1 | 0 | X | . | 000000 | 00000 | 0 |
| 8 | 1 | 1 | 1 | X | . | 000000 | 00000 | 0 |

X = don't care

The product appears on terminal $F_0$ in serial form as 00110111, the first bit appearing at time 1, such bit being the LSB, and the last bit appearing at time 8, such bit being the MSB. Therefore, the digital word produced on lines $XWT_1$–$XWT_5$ (which is applied in parallel form to serial-parallel multiplier 72) becomes multiplied by the digital word on line MDOW (or DTIN), such word being applied to such multiplier 72 via decoder 66 in serial form, and product appears as a sequence of binary numbers at terminal $F_0$, i.e., line XBOW.

DATA DECODER

The digital word produced in serial form by the serial parallel multiplier 72 is fed, via line XBOW, to data decoder 68. A digital word is produced at the output of data decoder 68, such word appearing on lines SRIN, $FIN_1$, $FIN_2$ and MDIN in response to a digital word applied to such decoder 68 on lines CT01–CT06, XBOW, SROW, FOW1 and FOW2. The relationship between the input digital word and the output digital word may be summarized by the following Table III:

Table III

| CT06 | CT05 | CT04 | SRIN | MDIN | FIN$_1$ | FIN$_2$ |
|---|---|---|---|---|---|---|
| 0 | 0 | 0 | XBOW | — | — | — |
| 0 | 0 | 1 | SUM BIT OF XBOW+SROW | — | CARRY BIT OF XBOW+SROW | — |
| 0 | 1 | 0 | DIFFERENCE BIT OF XBOW−SROW | SUM BIT OF XBOW+SROW | CARRY BIT OF XBOW+SROW | BORROW BIT OF XBOW−SROW |
| 0 | 1 | 1 | XBOW | SROW | — | — |
| 1 | 0 | 0 | SUM BIT OF XBOW+SROW | — | CARRY BIT OF XBOW+SROW | — |
| 1 | 0 | 1 | DIFFERENCE BIT OF XBOW−SROW | SUM BIT OF XBOW+SROW | CARRY BIT OF XBOW+SROW | BORROW BIT OF XBOW−SROW |
| 1 | 1 | 0 | — | SROW | — | — |
| 1 | 1 | 1 | — | XBOW | — | — |

The signals in lines CT01–CT03 are provided for utilization of the XBOW+SROW and XBOW−SROW computations, as will be shown in connection with Table IV (FIG. 7).

Referring to Table III, when lines CT04, CT05, CT06 are 0,0,0, the bit on line XBOW becomes coupled to line SRIN. When lines CT04, CT05, CT06 are 0,0,1, respectively, the bit on line XBOW is added to the bit on line SROW, the sum bit of the result is applied to line SRIN and the carry bit is applied to line $FIN_1$, as illustrated, after initialization, in the following examples:

| FOW$_1$ | XBOW | SROW | SRIN | FIN$_1$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

When lines CT04, CT05, CT06 are 0,1,0 respectively, the bit on line XBOW is subtracted from the bit on line SROW, the difference bit of the result is applied to line SRIN and the borrow bit is applied to line $FIN_2$, as illustrated, after initilization, in the following examples:

| FOW$_2$ | XBOW | SROW | SRIN | FIN$_2$ |
|---|---|---|---|---|
| 0 | 0 | 0 | 1 | 0 |
| 0 | 0 | 1 | 0 | 0 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 1 |
| 1 | 1 | 1 | 0 | 1 |

In view of the foregoing Table III above clearly describes the relationship between the digital word applied to the decoder 68 and the digital word produced at the output of such decoder 68.

Lines SRIN, $FIN_1$ and $FIN_2$ are fed to a temporary storage section 90 and line MDIN is fed to RAM 70. Temporary storage section 90 includes an 8 bit shift register 80, a leading edge-triggered D-type flip/flop 82 (F/F$_1$) and a leading edge-triggered D-type flip/flop 84 (F/F$_2$). Line SRIN is fed to the shift register 80, each bit thereof being coupled through the 8 stages thereof in response to clock pulses on line CP in a conventional manner. Therefore, after 8 clock pulses the bits of data on line SRIN appear at the output of shift register 80 (i.e., on line SROW). The flip/flops 82 and 84 are set to the signals on lines $FIN_1$, $FIN_2$, respectively. The output of flip/flop 82 appears on line $FOW_1$ and the output of flip/flop 84 appears on line $FOW_2$. The lines $FOW_1$ and $FOW_2$ provide the carry and borrow bits respectively required to perform the complete "XBOW+SROW" and "XBOW−SROW" operations described above. A detailed Table IV (FIG. 7) describes the relationship between the digital word applied to decoder 68 and the digital word appearing at the output of decoder 68. It should be noted that in Table IV (FIG. 7) a decimal digit is used to represent the eight combinations of the bits on lines CT03–CT01 and also on lines CT06–CT04 (for example; CT06 = 0, CT05 = 0, CT04 = 0 is represented in column CT06–CT04 as 0; CT06 = 0, CT05 = 0, CT04 = 1 is represented in column CT06–CT04 as 1; CT06 = 0, CT05 = 1, CT04 = 0 is represented in column CT06–CT04 as 2; CT06 = 0, CT05 = 1, CT04 = 1 is represented in column CT06–CT04 as 3, etc.; CT03 = 1, CT02 = 1, CT01 = 1 is represented in column CT03–CT01 as 7, etc.).

FFT PROCESSOR OPERATION

Referring now also to FIG. 8, the Table shown therein describes the operation of the FFT processor 38 in its calculation of the so-called "Butterfly" operation referred to in connection with Equations 3 and 4. It is here noted that the complex digital words A and B have been stored in RAM 70 in a manner to become apparent hereinafter. Then lines CT06, CT05, CT04, CT03 are 0, 0, 0, 0 respectively, the RAM 70 is read enabled (i.e., line WEBL is low) and data in the locations associated with the four bit real portion of the complex digital word A, i.e., $A_{RE}$, (Eqs. 1 and 2) is read therefrom and appears serially on line MDOW. (Referring to FIG. 6 it is noted that when line CT03 is 0 (or 1) four clock pulses are applied to RAM 70 and lines CT01, CT02 cycle through four different combinations of binary values thereby defining a four bit wordlength, i.e., the wordlength of the real or imaginary portion of the complex digital words A or B.) Also, the complex weighting coefficient $Re[W_n]$ is read from the multiplier coefficient decoder 64. Such coefficient $Re[W_n]$ and the serially retrieved four bits of the real portion of the digital word A ($A_{RE}$) are multiplied in the serial parallel multiplier 72, the product $X_1 = A_{RE} RE[W_n]$) appears as an 8 bit serial word on line XBOW as described above. Because the product $X_1$) is 8 bits (i.e., a double precision word) the last 4 bits (i.e., the most significant bits) thereof appearing on line XBOW when the signals on lines CT06, CT05, CT04, CT03 are 0, 0, 0, 1 respectively. The product ($X_1$) is coupled through data decoder 68 and line SRIN to the input of serial shift register 90.

When lines CT06, CT05, CT04, CT03 are 0, 0, 1, 0 respectively, the four bits in an imaginary portion of the complex word A (i.e., $A_{IM}$) are read from RAM 70 and, as with $A_{RE}$, appear serially as line MDOW. The multiplier coefficient decoder 64 produces the coefficient $-Im[W_n]$ which becomes multiplied by $A_{IM}$ in the serial parallel multiplier 72. The product $X_2 = -A_{IM}Im[W_n]$ appears serially, as an 8 bit word, on line XBOW (the last four bits (i.e. the most significant bits) of such product ($X_2$) appearing on line XBOW when lines CT06, CT05, CT04, CT03 are 0,0,1,1 respectively. It is noted that when lines CT06, CT05, CT04, CT03 are 0,0,1,0 respectively the first four bits of the product $X_1$ appear at the output of the temporary storage 90 and are applied to the data decoder 68 synchronously with the first four bits of the product $X_2$ and when lines CT06, CT05, CT04, CT03 are 0,0,1,1, the last 4 bits of the products $X_1$, $X_2$ become synchronously applied to such data decoder 68. During these two periods of time data decoder 68 decodes the digital words applied thereto to produce on lines SRIN, FIN$_1$, FIN$_2$, the sum of the digital word serially applied to line XBOW (i.e., the product $X_2$) and the digital word serially applied to the line SROW (i.e., the product $X_1$) in a manner discussed above. It is noted that the four least significant bits of the sum $X_1+X_2$ are formed during the period when lines CT06, CT05, CT04 and CT03 are 0,0,1,0 respectively and the four most significant bits of the sum $X_1+X_2$ are formed during the period when lines CT06, CT05, CT04 and CT03 are 0, 0, 1, 1 respectively.

During the period of time when lines CT06, CT05 and CT04 are 0,1,0, respectively, the real portion of the complex digital word B (i.e., $B_{RE}$) is read from RAM 70 and multiplied by the scaling factor by the serial parallel multiplier 72 to form the product $X_3 = B_{RE}$. The sum of the products $X_1$ and $X_2$ (i.e., $X_1+X_2$) appear at the output of temporary storage 90 and is applied to data decoder 68 synchronously with the product $X_3$. The data decoder 68 forms the difference between the digital words serially applied to such decoder 68 (also taking into consideration carry bits on lines FOW$_1$, FOW$_2$) to form, on lines SRIN, FIN$_1$, FIN$_2$, a serial digital word representative of the word $A'_{RE} = -(X_1+X_2) + X_3$ and on line MDIN a serial digital word representative of $B'_{RE} = (X_1+X_2) + X_3$. The four most significant bits of $B'_{RE}$ appear when lines CT06, CT05, CT04, CT03 are 0,1,0,1 respectively and during such period of time the RAM address and control decoder 62 produces a high signal on line WEBL thereby enabling the four most significant bits of $B'_{RE}$ to become stored in RAM 70.

During the period of time when lines CT06, CT05, CT04 are 0,1,1, respectively, the real portion of the complex digital word A (i.e., $A_{RE}$) is again read serially from RAM 70 and here now multiplied in serial parallel multiplier 72 by the scaling coefficient $Im[W_n]$ to form the product $X_4 = A_{RE}Im[W_n]$ which appears as an 8 bit word in serial form on line XBOW. The word $A'_{RE}$ appears serially at the output of temporary storage 90 and is applied to data decoder 68 synchronously with the product $X_4$. The data decoder 68 passes the product $X_4$ serially to line SRIN and the word $A'_{RE}$ serially to line MDIN. The four most significant bits of the word $A'_{RE}$ become stored in RAM 70 when lines CT06, CT05, CT04, CT03 are 0,1,1,1.

During the period of time when lines CT06, CT05, CT04 are 1,0,0, respectively, the imaginary portion of the complex digital word A (i.e., $A_{IM}$) is again read serially from RAM 70 and here now multiplied in the serial parallel multiplier 72 by the scaling coefficient $Re[W_n]$ to form the product $X_5 = A_{IM} Re[W_n]$ which appears serially on line XBOW. The product $X_4$ appears serially at the output of temporary storage 90 and is applied to data decoder 68 synchronously with the product $X_5$. The data decoder 68 passes the sum of the products $X_4$ and $X_5$ (i.e., $X_4+X_5$) serially to lines SRIN, FIN$_1$, FIN$_2$.

During the period of time when lines CT06, CT05, CT04 are 1,0,1, respectively, the imaginary portion of the complex digital word B (i.e., $B_{IM}$) is read serially from RAM 70 and is multiplied by scaling factor 1 to form the product $X_6 = B_{IM}$ which appears serially on line XBOW. The sum of the products $X_4$ and $X_5$ (i.e., $X_4+X_5$) appears serially at the output of temporary storage 90 and is applied to data decoder 68 synchronously with the product $X_6$. The data decoder 68 passes the difference $A'_{IM} = -(X_4+X_5)+X_6$ to lines SRIN, FIN$_1$, FIN$_2$ and the sum $B'_{IM} = (X_4+X_5)+X_6$ to line MDIN. During the period of time when lines CT06, CT05, CT04, CT03 are 1,0,1,1, respectively, the four most sinificant bits of $B'_{IM}$ are written into RAM 70.

During the period of time when lines CT06, CT05, CT04 are 1,1,0, respectively, the word $A'_{IM}$ is produced serially at the output of temporary storage 70 and passes through data decoder 68 to appear serially on line MDIN. The four most significant bits of $A_{IM}$ are written into RAM 70 when lines CT06, CT05, CT04, CT03 are 1,1,0,1, respectively. It is noted that when lines CT06, CT05, CT04 are 1,1,0, respectively, data read from RAM 70 is not significant during this period of time and therefore the scaling coefficient decoder 64 is zero.

By the period of time when lines CTO6, CTO5, CTO4 are 1,1,1, respectively, $A'_{RE}$, $A'_{IM}$, $B'_{RE}$ and $B'_{IM}$ have been formed where $A' = A'_{RE} + jA'_{IM}$ $B' = B'_{RE} + jB'_{IM}$ as in Equations (1) and (2). This completes computation of one "Butterfly" as described in Eqs. (1) and (2).

Referring to FIG. 3, it follows then that, upon completion of pass 3 by FFT processor 38, the RAM 70 have stored therein the digital words $S_0$---$S_7$, such words representing eight frequency components (magnitude and phase) of the sampled analog signal. The digital words $S_0$---$S_7$ are then read from RAM 70 in response to signals on lines $MAD_1$-$MAD_7$ and line WEBL, such signals being developed by RAM address and control decoder 62 in response to signals on lines CTO1-CT11. The data stored in the RAM 70 can be retrieved therefrom via line MDOW during the time interval when CT10, CTO9 equals 1, 1 respectively, and fed to radar receiver 20 via D/A converter 52 (FIG. 2) to time the frequency of such receiver 20.

Referring again to FIG. 8 it is also noted that during the period of time when lines CTO6, CTO5, CTO4 are 1,1,1, respectively, serial data on line DTIN is fed to line XBOW (after passing through the serial-parallel multiplier 72 as described above in connection with such multiplier 77) and passes RAM 70 via line MDIN and data decoder 68. Therefore, a "real" or "imaginary" portion of a sampled complex digital word becomes stored in RAM 70 so that when pass 1 of a Fast Fourier Transform is to be performed on eight new samples of the analog signal all eight new samples are stored in RAM 70.

Having described a preferred embodiment of this invention, it is evident that other embodiments incorporating its concepts may be used. For example, the coefficients may include a scale factor, such as ½, to reduce the possibility of overflowing the processor. It is felt, therefore, that this invention should not be restricted to the preferred embodiment but rather should be limited to the spirit and scope of the appended claims.

What is claimed is:

1. In a radar-guided missile having a radar receiver for receiving radar return signals, a signal processor for processing such radar return signals to provide a discrete Fast Fourier Transform on such radar return signals, such signal processor comprising:
   (a) means for separating such radar return signals into two quadrature components;
   (b) means for converting each sample of such components into a corresponding digital word;
   (c) means for converting each digital word into a sequence of binary digits;
   (d) clock means for producing a sequence of binary control signals;
   (e) scaling means, responsive to a portion of the sequence of binary control signals, for scaling each digital word by a factor selected in accordance with the binary control signals to form a sequence of binary digits corresponding to such scaled digital word;
   (f) memory means for storing and serially retrieving such latter sequence of binary digits;
   (g) data decoder means, responsive to at least a portion of the sequence of binary control signals, the serially retrieved sequence of binary digits and a second sequence of binary digits corresponding to a different one of the digital words, for producing a sequence of binary digits corresponding to an arithmetic operation of the digital words in the two sequences of binary digits responded to by the data decoder means.

2. The signal processor recited in claim 1 wherein the scale means includes a serial-parallel multiplier.

* * * * *